United States Patent
McMinn et al.

(10) Patent No.: US 11,790,128 B2
(45) Date of Patent: Oct. 17, 2023

(54) MACHINE LEARNING-BASED PART DETERMINATIONS FOR COMPUTER-AIDED DESIGN (CAD) ASSEMBLIES

(71) Applicant: Siemens Industry Software Inc., Plano, TX (US)

(72) Inventors: Matthew McMinn, Clio, MI (US); Neeraj Panhalkar, Mason, OH (US); Mohsen Rezayat, Cincinnati, OH (US)

(73) Assignee: Siemens Industry Software Inc., Plano, TX (US)

( * ) Notice: Subject to any disclaimer, the term of this patent is extended or adjusted under 35 U.S.C. 154(b) by 530 days.

(21) Appl. No.: 16/983,022

(22) Filed: Aug. 3, 2020

(65) Prior Publication Data
US 2022/0035966 A1    Feb. 3, 2022

(51) Int. Cl.
*G06F 30/20* (2020.01)
*G06N 20/00* (2019.01)
(Continued)

(52) U.S. Cl.
CPC ............ *G06F 30/20* (2020.01); *G06N 5/02* (2013.01); *G06N 20/00* (2019.01); *G06T 11/20* (2013.01); *G06T 2210/12* (2013.01)

(58) Field of Classification Search
CPC ...... G06F 30/20; G06F 2111/20; G06F 30/10; G06F 30/27; G06N 5/02; G06N 20/00; G06T 11/20; G06T 2210/12
See application file for complete search history.

(56) References Cited

U.S. PATENT DOCUMENTS

| | | | |
|---|---|---|---|
| 2009/0024647 A1* | 1/2009 | Hein | G06F 16/25 707/999.102 |
| 2019/0347668 A1* | 11/2019 | Williams | H04L 51/02 |

(Continued)

FOREIGN PATENT DOCUMENTS

| | | | | |
|---|---|---|---|---|
| CN | 104598683 A | * | 5/2015 | |
| CN | 107256009 A | * | 10/2017 | ....... G05B 19/41885 |

(Continued)

OTHER PUBLICATIONS

Jing, Bai et al: "Designreuse oriented partial retrieval of CAD models"; Computer-Aided Design; vol. 42; No. 12; pp. 1069-1084; XP002656558; 16 pages.

(Continued)

*Primary Examiner* — Kandasamy Thangavelu

(57) ABSTRACT

A computing system may include an assembly access engine configured to access a computer-aided design (CAD) assembly that digitally represents a product component that includes multiple parts. The computing system may also include a part determination engine configured to determine a recommended part for the CAD assembly, including by providing the CAD assembly as an input to a machine-learning (ML) model trained with assembly structure data of CAD assemblies of a common product type as the CAD assembly, generating a candidate part set through the ML model, filtering the candidate part set based on physical and cost characteristics of the different candidate parts of the candidate part set, and identifying the recommended part from the filtered candidate part set. The part recommendation engine may also be configured to insert the recommended part into the CAD assembly and provide the CAD assembly in support of physical manufacture.

14 Claims, 5 Drawing Sheets

(51) Int. Cl.
*G06N 5/02* (2023.01)
*G06T 11/20* (2006.01)

(56) References Cited

U.S. PATENT DOCUMENTS

| | | | |
|---|---|---|---|
| 2020/0013156 A1* | 1/2020 | Weiss | G06V 10/25 |
| 2020/0364310 A1* | 11/2020 | Reddy | G06F 40/205 |
| 2021/0004719 A1* | 1/2021 | Dupont De Dinechin | G06N 20/00 |

FOREIGN PATENT DOCUMENTS

| | | | | |
|---|---|---|---|---|
| CN | 109783839 A | * | 5/2019 | G06F 30/00 |
| CN | 111095258 A | * | 5/2020 | G06Q 10/103 |
| EP | 3514707 A1 | * | 7/2019 | G06F 30/00 |
| WO | WO 2015058147 A1 | * | 4/2015 | G06Q 30/0611 |

OTHER PUBLICATIONS

Wang Pan et al: "Reuse-oriented common structure discovery in assembly models"; Journal of Mechanical Science and Technology; vol. 31; No. 1; pp. 297-307; XP036135447; 2017, 11 pages.

Huang, Rui et al: "An effective subpart retrieval approach of 3D CAD models for manufacturing process reuse"; Computers in Industry; vol. 67; pp. 38-53; XP029188297; 2014; 16 pages.

Schinko, Christoph et al: "Search & Retrieval in CAD Databases—A User-centric State-of-the-Art Overview"; Proceedings of the 12th International Joint Conference on Computer Vision, Imaging and Computer Graphics Theory and Applications; pp. 306-313; XP055873984; 2017; 8 pages.

EP Search Report dated Jan. 7, 2022, for EP Application No. 21188863.1, 10 pages.

\* cited by examiner

MACHINE LEARNING-BASED PART DETERMINATIONS FOR COMPUTER-AIDED DESIGN (CAD) ASSEMBLIES

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design, configuration, and simulated testing of product structures and product manufacture.

BRIEF DESCRIPTION OF THE DRAWINGS

Certain examples are described in the following detailed description and in reference to the drawings.

DETAILED DESCRIPTION

Figure 1:
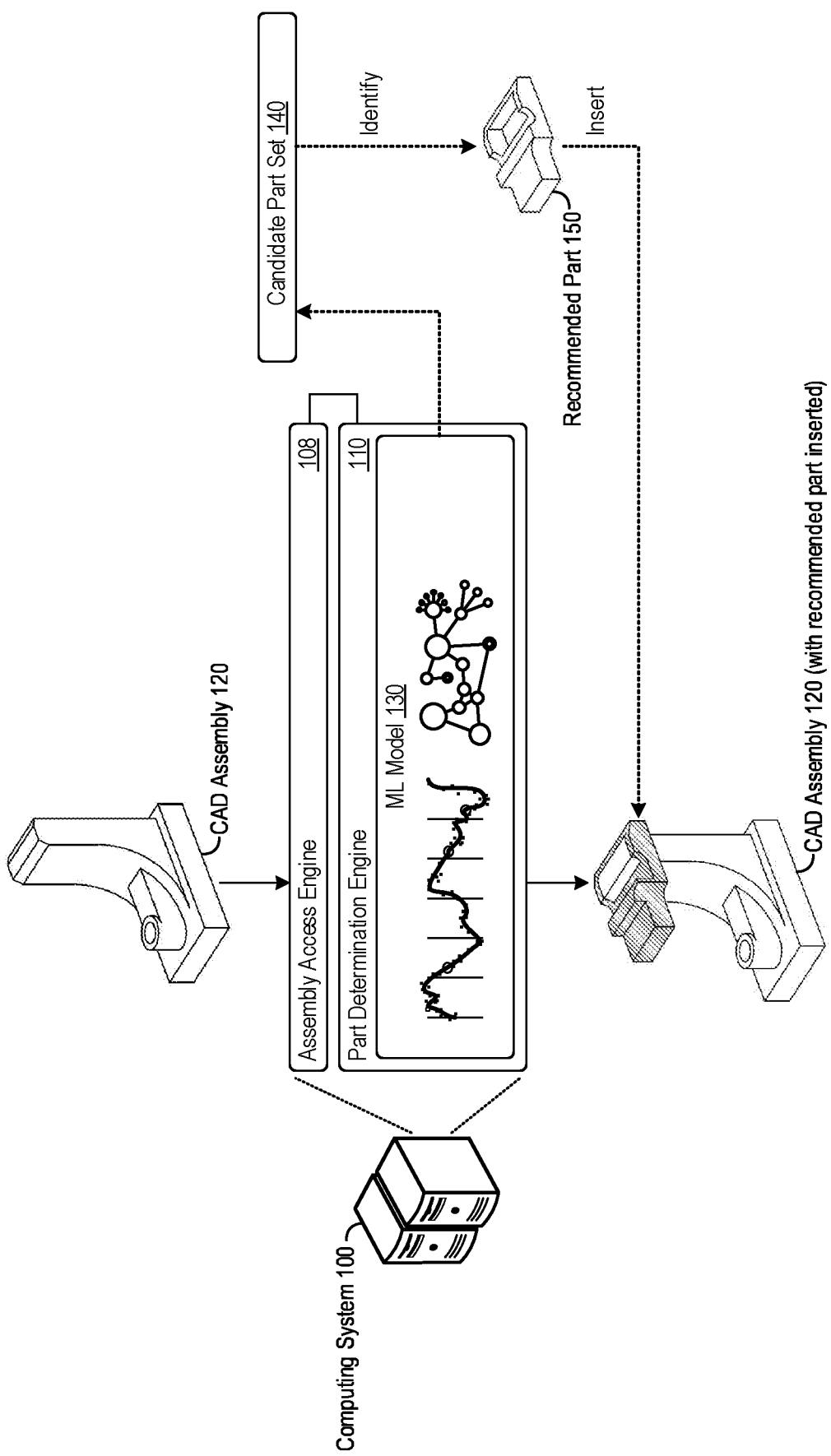
FIG. 1 shows an example of a computing system that supports machine learning (ML)-based part determinations for CAD assemblies.

Modern technological advances have allowed industry products of countless types to be developed and manufactured with increasing complexity. CAD and PDM systems can track product series that can include parts numbering in the hundreds of thousands, millions, and at times more. As used herein, a part may include any discrete object that can be represented digitally (e.g., as CAD data), and parts may be combined to form products or components thereof. Along with parts, modern CAD or PDM systems can manage CAD assemblies, which may refer to any representation of how parts combine to form a particular product or product component. As such, CAD assemblies may represent different products (e.g., a given CAD assembly for a hard drive, another CAD assembly for a graphics card), different subsystems or components of a given product (e.g., electrical and cooling subsystems of a server rack), different variants of a given product (e.g., a base vehicle model, mid-range vehicle model, top end vehicle model), and the like.

With increasingly immense part libraries, generation of new CAD assemblies or coordinating part replacements in existing CAD assemblies has become increasingly difficult. While general part requirements for CAD assemblies may be known a priori, the number of possible parts to fill such part requirements can be overwhelming. For instance, a CAD assembly for a hard drive may require a bolt part to attach a bracket, but a PDM library may include hundreds of different available bolts to potentially satisfy the bolt requirement for the hard drive. Current part searching strategies can be cumbersome and ineffective. As one example, CAD programs can provide filtering or other advanced search capabilities to reduce the search space of potential parts. However, to ensure the efficacy of such advanced searches, constant data maintenance to ensure data integrity and accuracy is needed, which can be difficult as part attributes change over time, whether through updated versions, discontinuances, and the like.

Further complicating the efficacy of part determinations, part data is often stored in disparate data systems. To fully evaluate parts for CAD assemblies, multiple factors may require consideration, such physical part characteristics (e.g., weight, dimensions, materials), cost, availability, part lifecycles, industry standards, and other factors that collectively form a context in which the part will be used within the CAD assembly. Existing search capabilities of PDM or CAD searches may be limited to part information expressly stored in such systems, and additional information like part cost or availability data, product manufacturer information (PMI), industry standard data, and the like may be inaccessible for local searches in CAD and PDM applications.

The disclosure herein may provide systems, methods, devices, and logic for ML-based part determinations for CAD assemblies. As described in greater detail below, the ML-based part determination features disclosed herein may utilize machine-learning capabilities to increase the efficiency of part determinations for CAD assemblies. Such ML-based part determination features may reduce required user times needed to optimize the selection of a particular part within a given assembly as well as provide capabilities to simultaneously optimize entire assemblies. In particular, the ML part determination capabilities may be trained with training sets comprised of CAD assembly structures, allowing ML-based part determinations to account for various hierarchical relationships within CAD assembly structures. By doing so, the features presented herein may improve the efficiency of the assembly part determination processes by leveraging and analyzing previously created structures for new part or replacement part determinations.

Additionally or alternatively, the ML-based part determination features described herein may account for the context in which a given part will be selected for use in a CAD assembly, providing the capability to integrate part data from various disparate sources through a common ontology (e.g., via knowledge graphs). By doing so, the features described herein may increase the discoverability and determination of existing parts in a product library within an organization, which may lead to greater part reuse, product structures that better meet specified part criteria, and increased resource efficiency in terms of time, cost, and computational requirements.

These and other ML-based part determination features and technical benefits are described in greater detail herein.

FIG. 1 shows an example of a computing system 100 that supports ML-based part determinations for CAD assemblies. The computing system 100 may take the form of a single or multiple computing devices such as application servers, compute nodes, desktop or laptop computers, smart phones or other mobile devices, tablet devices, embedded controllers, and more. In some implementations, the computing system 100 implements a CAD or PDM application that supports the design, analysis, simulation, or other processing of product assemblies and underlying parts.

As an example implementation to support any combination of the ML-based part determination features described herein, the computing system 100 shown in FIG. 1 includes an assembly access engine 108 and a part determination engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the assembly access engine 108 may access a CAD assembly 120, and the CAD assembly 120 may be any data structure that digitally represents a product component that includes multiple parts. As such, the CAD assembly 120 may include multiple different parts (e.g., in CAD form) and a structure by which such parts are assembled together to form a part component. CAD assemblies accessed by the assembly access engine 108 may take any number of forms and may model any type of product or its components, from microscopic biotechnology sensor assemblies to complex automobile assemblies to immense airplane assemblies. Accordingly, the CAD assembly 120 may include any number of parts, and the computing system 100 may optimize the selection of candidate parts to include in the CAD assembly 120, whether as part of a new product design or modifying an existing product design.

In operation, the part determination engine 110 may determine recommended parts for the CAD assembly 120. The part determination engine 110 may determine a recommended part based on any number of user inputs, which may specify a particular part location, part type, assembly requirement, or existing part to adapt, select, or replace. For instance, the part determination engine 110 may identify a user selection of a given portion of the CAD assembly 120, and determine a recommended part located in the selected assembly portion to insert into the product component design represented by the CAD assembly 120. As another example, the part determination engine 110 may determine a user selection of an existing part of a CAD assembly, and determine recommended parts to replace the selected existing part.

As yet another example, the part determination engine 110 may determine replacement parts based on the parts missing in a given (incomplete) CAD assembly. To illustrate, the part determination engine 110 may access a CAD assembly for a new computer hard drive design, and automatically determine recommended parts for the hard drive assembly that have not yet been included in the design. In such an illustration, the CAD assembly may comprise only an enclosure for the hard drive design, and the part determination engine 110 may determine recommended bolts, logic board, and other missing parts to include in the new hard drive design.

In determining recommended parts for a CAD assembly 120, the part determination engine 110 may implement, access, or otherwise utilize a machine learning model 130. By leveraging ML capabilities, the part determination engine 110 may increase the effectiveness and efficiency of part determinations, particularly when compared to user-based searches and conventional search reduction capabilities of existing CAD and PDM systems. Instead of narrowing an existing search space through user-specified search terms, the part determination engine 110 may proactively recommend compatible parts, selected based on a usage context for the part in a given CAD assembly.

In the example shown in FIG. 1, the part recommendation engine 110 itself implements the ML model 130 (e.g., as a hardware-software combination). In other examples, the part recommendation engine 110 may remotely access an ML model 130 implemented by a separate system (e.g., a back-end application server).

The ML model 130 may implement or support any number of ML capabilities in support of part determinations for CAD assemblies. For instance, the ML model 130 may implement any number of supervised, semi-supervised, unsupervised, or reinforced learning models determine candidate parts for inclusion in a given CAD assembly. As examples, the ML model 130 may utilize Markov chains, context trees, support vector machines, neural networks, Bayesian networks, or various other machine learning components to interpret existing CAD assembly structures and determine recommended parts for the CAD assembly 120. In terms of training, the ML model 130 may be trained with assembly structure data of CAD assemblies of a common product type as the CAD assembly 120, thus allowing the ML model 130 to provide part recommendations that are specifically relevant to the CAD assembly 120.

In the example shown in FIG. 1, the part determination engine 110 may provide the CAD assembly 120 as an input to the ML model 130 and generate a candidate part set 140 using the ML model 130. The candidate part set 140 may comprise different candidate parts to include in the CAD assembly 130 as a recommended part. With part libraries potentially numbering in the hundreds of thousands or more, the part determination engine 110 may provide various part options for inclusion in the CAD assembly 120, but doing so through ML-based determinations. The part determination engine 110 may identify one or multiple recommended parts from the candidate part set 140 for insertion into the CAD assembly 120, such as the recommended part 150 shown in FIG. 1. In some instances, the part determination engine 110 may generate a ranked list of the candidate part set 140, doing so based on user-specified criteria (e.g., cost, availability, manufacturer data, etc.) and determine the recommended part 150 based on a user selection from the ranked list.

In operation, the part determination engine 110 may further insert the recommended part 150 into the CAD assembly 120 and provide the CAD assembly 120 (with the recommended part 150 inserted) in support of physical manufacture of the product component represented by the CAD assembly 120. In doing so, the part determination engine 110 may store the CAD assembly 120 in a product database, transmit the CAD assembly 120 to a manufacturing or product fabrication plant, perform simulations or product analyses on the CAD assembly 120, or any other subsequent processing of the CAD assembly 120 to support the manufacture of the represented product component.

The part determination engine 110 may thus support ML-based part determinations for CAD assemblies. Some example features of ML model training and ML model application according to the present disclosure are described in greater detail next with reference to FIG. 2.

Figure 2:
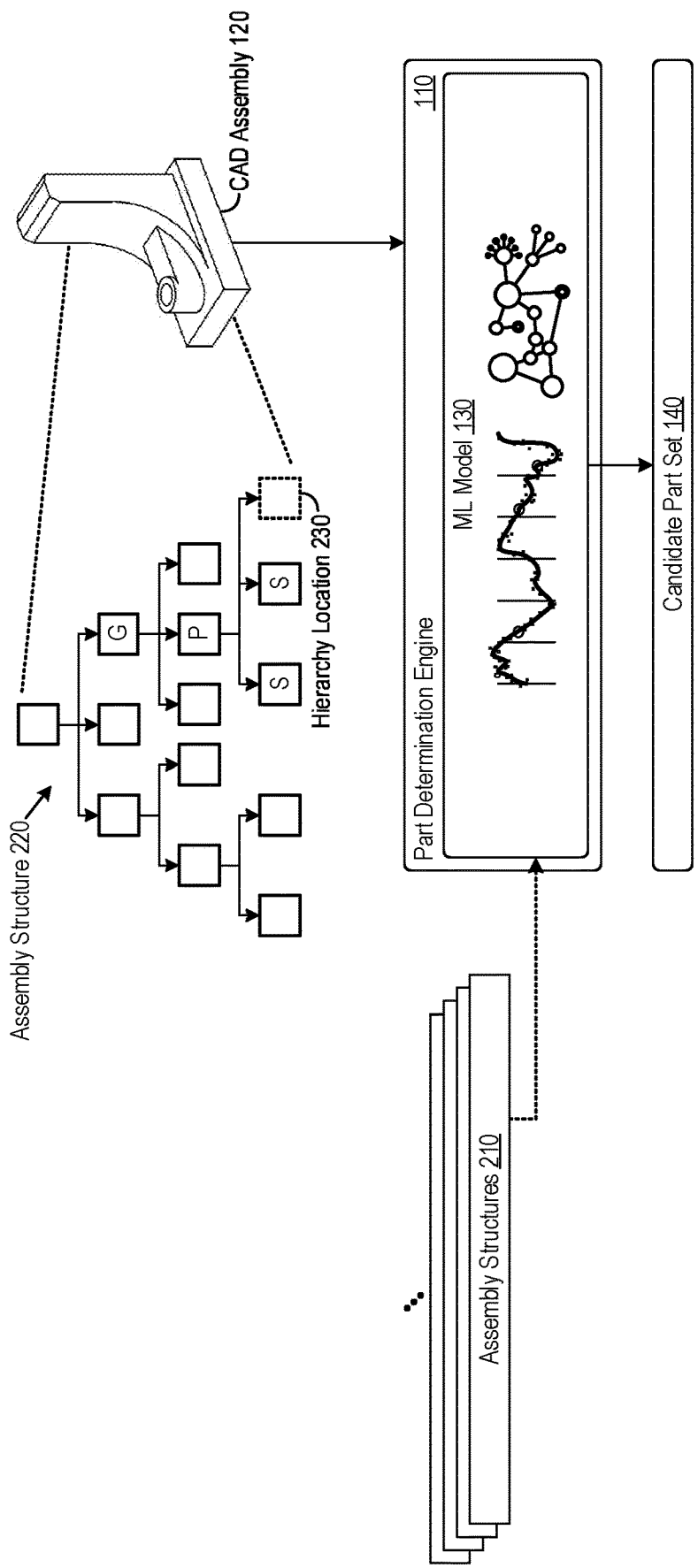
FIG. 2 shows an example training and application of a ML model by a part determination engine to support ML-based part determinations.

FIG. 2 shows an example training and application of a ML model 130 by the part determination engine 110 to support ML-based part determinations. In the example of FIG. 2, the part determination engine 110 implements and trains the ML model 130, however other implementations are contemplated herein. For instance, the ML model 130 may be trained and implemented remotely from the part determination engine 110, and the part determination engine 110 may access a pre-trained ML model 130 that is physically remote from the part determination engine 110.

The ML model 130 implemented or used by the part determination engine 110 may be trained with training data comprised of existing CAD assemblies. In that regard, training datasets used to train the ML model 130 may be comprised of CAD assemblies of previously designed products that the ML model 130 may be configured to parse, analyze, and process in order to support part determinations for input CAD assemblies. In some implementations, the part determination engine 110 may configure a training of the ML model 130 such that the ML model 130 differentiates between training CAD assemblies of different product types. A product type may refer to any form of classifications for CAD assemblies, and may further include sub-classifications. That is, the ML model 130 may be configured to distinguish CAD assemblies of different product types (e.g., automobile vehicles vs. computer hard drives), and in some instances sub-classifications as well (e.g., sedan vehicles vs. sports utility vehicles). In some cases, the ML model 130 may be comprised of multiple separate models, each trained using CAD assembly training data of a particular product type or sub-type. In such a way, the ML model 130 may support diversified part recommendations based on different product types.

In some implementations, the ML model 130 may be trained specifically with CAD assembly structures, such as the assembly structures 210 shown in FIG. 2. An assembly structure may refer to any hierarchical representation of part composition of a CAD assembly, for example as a hierarchical tree representing how part assemblies are constructed through underlying parts. Assembly structures 210 may thus take the form of data objects associated with or an element of CAD assemblies to define structural relationships between underlying assembly parts. The top level or root node of an assembly structure (e.g., a hierarchical tree) may represent the particular product component, and underlying nodes in the hierarchical tree may represent part components, and so on. In that regard, the assembly structures 210 may represent the particular parts included in existing CAD assemblies as well hierarchical or structural relationships between the particular parts. The ML model 130 may be trained to provide part recommendations based on such hierarchical structures, including by accounting for sibling relationships and parent relationships in CAD assembly structures, or combinations thereof. As used herein, parent relationships may include direct parent relationships, grandparent relationships, and further parent relationships extending up to a root node of an assembly structure An example of such hierarchy-aware ML-based part recommendations is shown in FIG. 2, in which the CAD assembly 120 may include or be represented by an assembly structure 220. The ML model 130 may determine part recommendations for the CAD assembly 120, and specifically for a particular part type with a hierarchy location 230 in the assembly structure 220 of the CAD assembly 120. Based on the hierarchy location 230, the ML model 130 may be configured to generate a candidate part set 140 that accounts for sibling relationships of the hierarchy location 230 (e.g., labeled as the "S" elements in the assembly structure 220), parent relationships of the hierarchy location 230 (e.g., labeled as the "P" element in the assembly structure 220 and the "G" element in the assembly structure 220), or combinations thereof. In doing so, the ML model 130 may have processed assembly structures 210 to determine particular parts that are appropriate for the hierarchy location 230 when the particular "S" sibling elements as well as the "P" and "G" parent elements in the assembly structure 220 are present in a given input CAD assembly.

As one implementation example, the ML model 130 may be implemented as a naive Bayesian classifier (also referred to as naive Bayes classifier), and part recommendations may be learned by the ML model 130 based on part frequency. The ML model 130 may thus process the assembly structures 210 to determine counts indicative of how often particular parts are included together in the same assembly, and such counts may be captured for sibling and parent relationships. Based on such count frequencies, the ML model 130 may generate part recommendations for the particular part type located at the hierarchy location 230 of the CAD assembly 120. Through naive Bayesian classifier implementations, the ML model 130 may increase the speed of part recommendations for input CAD assemblies, especially in comparison to other ML algorithms with increased complexity and computational requirements. A naive Bayesian classifier implementation of the ML model 130 may be particularly advantageous as CAD assemblies can include thousands of parts or more, and multiple part recommendations for complex CAD assemblies may strain computational resources. By focusing on sibling and parent relationships, naive Bayesian classifiers need not consider every possible combination of parts in the entire structure of a CAD assembly, instead focusing analyses and part recommendations based on sibling and parent relationships in the CAD assembly.

Accordingly, the part determination engine 110 may support the training and application of a ML model 130 for ML-based part determinations for CAD assemblies, doing so in any of the ways described herein. Additionally or alternatively, the part determination engine 110 may consider the context in which a given part is selected for inclusion in a particular CAD assembly, and may determine recommended parts accounting for geometric constraints, part and cost data for parts, and more. Examples of such features through candidate part filtering are described in greater detail next.

Figure 3:
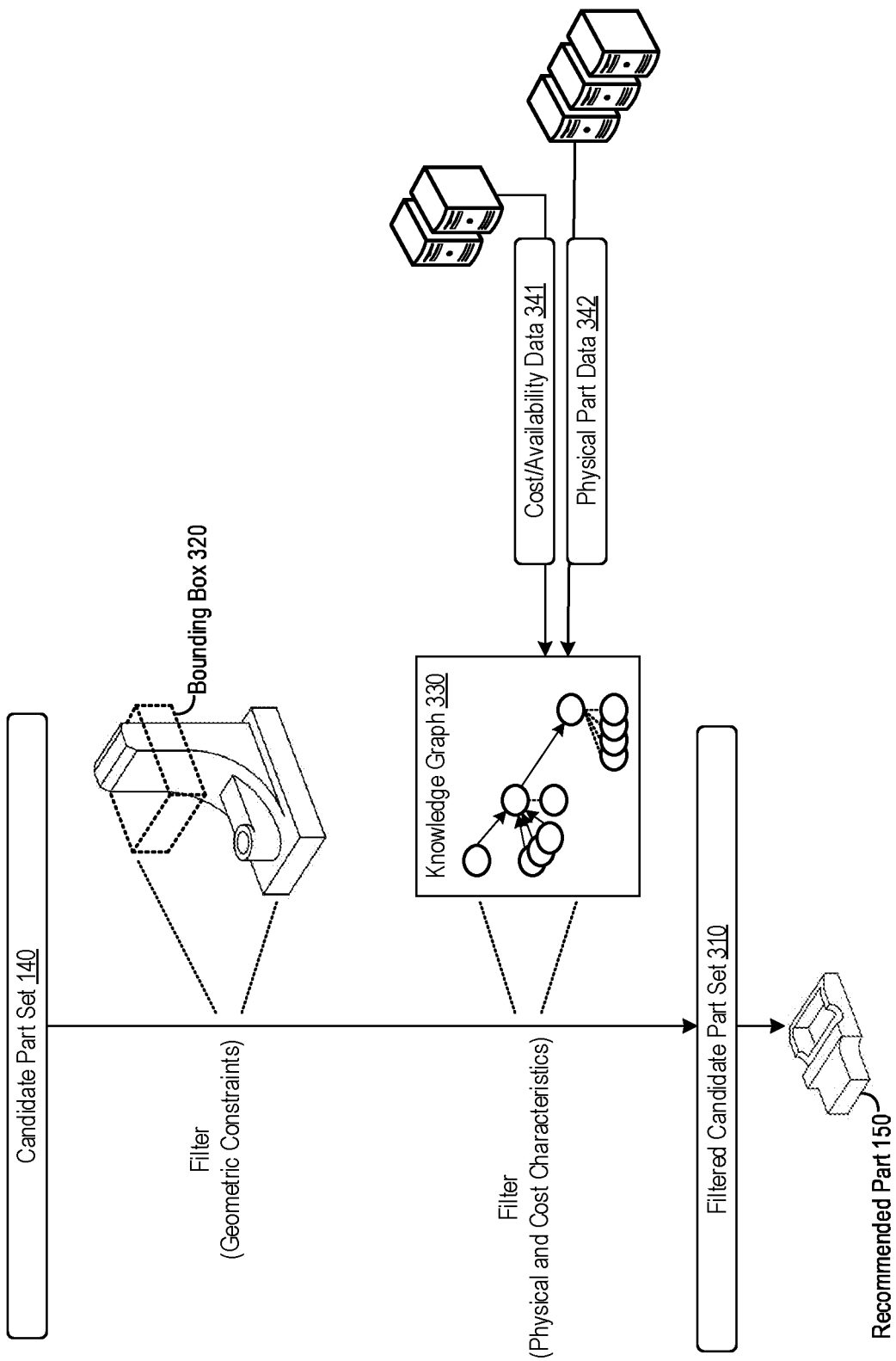
FIG. 3 shows examples of candidate part filtering that a part determination engine may perform to support ML-based part determinations for CAD assemblies.

FIG. 3 shows examples of candidate part filtering that the part determination engine 110 may perform to support ML-based part determinations for CAD assemblies. In the example shown in FIG. 3, the part determination engine 110 filters a candidate part set 140 (e.g., generated by the ML model 130) into a filtered candidate part set 310. Note that the part determination engine 110 need not perform such filtering sequentially from determination of the candidate part set 140, and may instead apply the filter features described in FIG. 3 as part of generating the candidate part set 140 or separately to determine additional or alternative candidate parts for inclusion in the candidate part set 140 independently of candidate parts identified by the ML model 130.

In some implementations, the part determination engine 110 may account for geometric constraints in part determinations for CAD assemblies. In the example of FIG. 3, the part determination engine 110 may filter the candidate part set 140 based on geometric constraints for a particular part type to newly insert or replace in a given CAD assembly. Filtering based on geometric constraints may be performed by the part determination engine 110 based on an assembly portion at which a recommended part is positioned in a CAD assembly. For instance, the part determination engine 110 may perform a geometric analysis of the assembly portion to determine a bounding box that specifies physical dimension constraints for a recommended part. In FIG. 3, the part determination engine 110 may determine the bounding box 320 for a CAD assembly 120, and then may filter the candidate part set 140 by removing, from the candidate part set 140, any of the different candidate parts with part dimensions that exceed the bounding box 320.

To perform a geometric analysis, the part determination engine 110 may perform a meshing process on an input CAD assembly and analyze the assembly portion based on other parts in the input CAD assembly positioned around the assembly portion at which a recommended part is to be positioned. For instance, the part determination engine 110 may generate a bounding box 320 based on presence of other parts at which a recommended part is to be inserted, assembly dimensions, part distance tolerances, or combinations of such. Additionally or alternatively to iterating through the candidate part set 140, the part determination engine 110 may access a geometric database of parts for candidate parts (e.g., alternatives to a replacement part). Candidate parts for part replacements may be identified through any number of shape matching algorithms that the part determination engine 110 implement. As another option for candidate part identification, the part determination engine 110 may geometrically analyze the position at which a recommended part is to be inserted, to determine particular shape, parameter, or size constraints to match for in the geometric database. The part determination engine 110 may align meshes of identified candidate parts within the mesh of the input CAD assembly to determine fit, and filter out any candidate parts that violate the geometric constraints for insertion of the recommended part.

Returning to the filtering examples of FIG. 3, the part determination engine 110 may account for physical and cost characteristics in part determinations for CAD assemblies. In the particular example of FIG. 3, the part determination engine 110 may filter the candidate part set 140 based on physical and cost characteristics of the different candidate parts of the candidate part set 140. By doing so, the part determination engine 110 may account for the context in which a recommended part is selected and used. Data for physical and cost characteristics of candidate parts may, however, be located remotely to CAD or PDM systems that may implement the part determination engine 110. In such cases, the part determination engine 110 may support data retrieval and analysis of part contexts from disparate or remote systems in order to support part determinations according to the present disclosure.

In some implementations, the part determination engine 110 may utilize knowledge graphs to support a common ontology to analyze, process, and compare candidate parts via part data obtained from disparate and remote systems. In the example of FIG. 3, the part determination engine 110 utilizes the knowledge graph 330 that utilizes a common ontology to track part data from multiple different systems that store different types of part data. For instance, the knowledge graph 330 may track cost and availability data 341 accessed from a supply chain system as well as physical part data 342, such as part weights and part, materials accessed from a manufacturer system (e.g., that stores PMI). Other examples of part data that the knowledge graph 330 may track via common ontology include part weight and material data generated or configured by a CAD system, part revision information from PDM systems, and more.

The particular filtering criteria applied by the part determination engine 110 may be user-configured. For instance, specific cost requirements, industry best-practices, product specifications, availability and manufacturing timetables, and the like may be provided to the part determination engine 110, through which the part determination engine 110 may filter the candidate part set 140 accordingly. In some instances, the part determination engine 110 may implement multi-objective optimization capabilities to analyze, process, and filter the candidate part set 140 according to multiple different criteria, e.g., cost, weight, availability, etc. Accordingly, the part determination engine 110 may support filtering of a candidate part set 140 into a filtered candidate part set 310. The part determination engine 110 may then determine a recommended part 150 from the filtered candidate part set 310 for insertion into a CAD assembly. As noted herein, identification of the recommended part 150 may include user selections (e.g., from a ranked list, which may be ranked according through multi-object optimizations).

While many of the examples described herein are presented for a particular recommended part 150 for a given CAD assembly 120, the part determination engine 110 may support multiple, concurrent part determinations for CAD assemblies. In that regard, the part determination engine 110 may determine multiple different recommended parts for a given CAD assembly, and further determine multiple different recommended CAD assembly options for a given CAD assembly type. For instance, for an input hard drive CAD assembly, the part determination engine 110 may apply the ML-based part determination features described herein to generate multiple different design options in the form of different recommended CAD assemblies (comprised of various different recommended CAD parts).

As such, the ML-based part recommendation features described herein may provide a comprehensive mechanism to support product designs, whether for new designs or replacing parts in existing designs.

Figure 4:
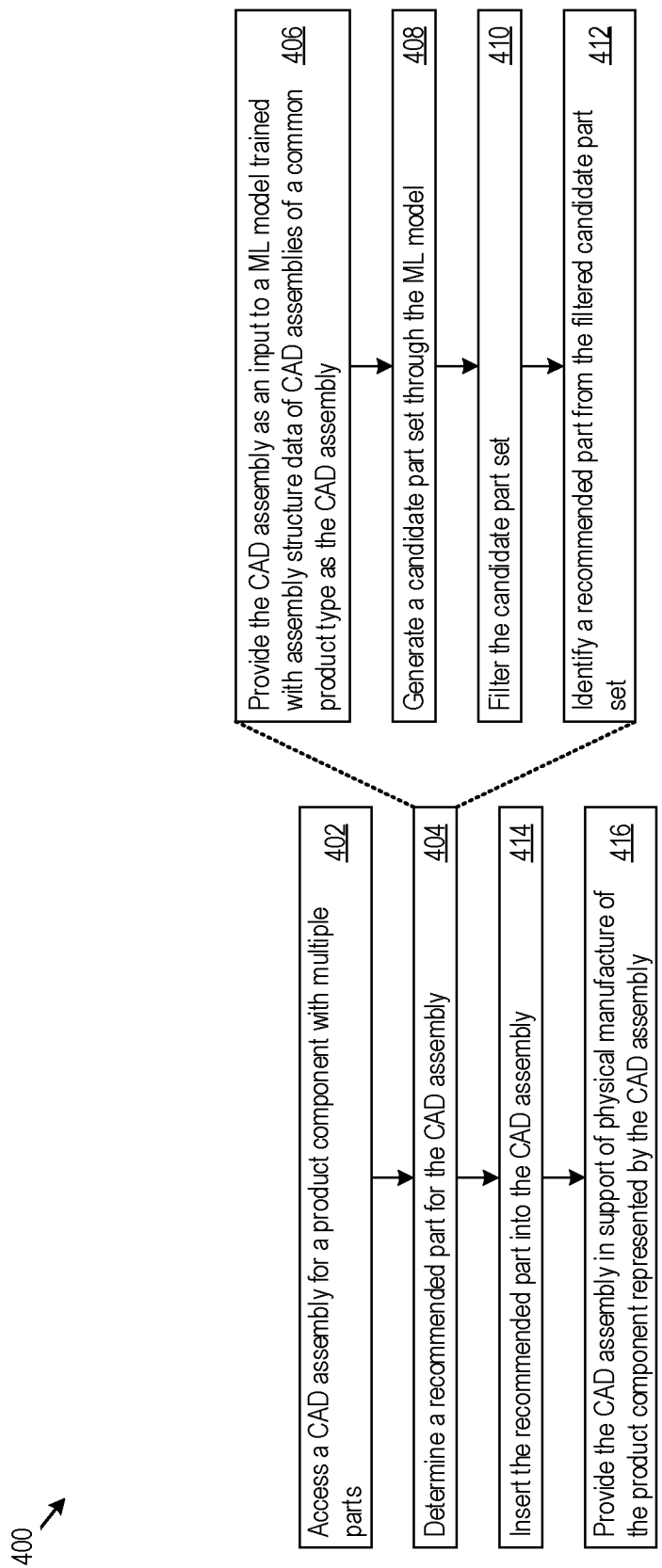
FIG. 4 shows another example of logic that a system may implement to support ML-based part determinations for CAD assemblies.

FIG. 4 shows an example of logic 400 that a system may implement to support ML-based part determinations for CAD assemblies. For example, the computing system 100 may implement the logic 400 as hardware, executable instructions stored on a machine-readable medium, or as a combination of both. The computing system 100 may implement the logic 400 via the assembly access engine 108 and the part determination engine 110, through which the computing system 100 may perform or execute the logic 400 as a method to support ML-based part determinations for CAD assemblies. The following description of the logic 400 is provided using the assembly access engine 108 and the part determination engine 110 as examples. However, various other implementation options by systems are possible.

In implementing the logic 400, the assembly access engine 108 may access a CAD assembly of a product component (402). The CAD assembly may digitally represent a product component that includes multiple parts. In implementing the logic 400, the part determination engine 110 may determine a recommended part for the CAD assembly (404), including by providing the CAD assembly as an input to an ML model trained with assembly structure data of CAD assemblies of a common product type as the CAD assembly (406), generating a candidate part set through the ML model (408), filtering the candidate part set based on physical and cost characteristics of the different candidate parts of the candidate part set (410), and identifying the recommended part from the filtered candidate part set (412). In implementation the logic 400, the part determination engine 110 may further insert the recommended part into the CAD assembly (414) and provide the CAD assembly in support of physical manufacture of the product component represented by the CAD assembly (416).

The logic 400 shown in FIG. 4 provides illustrative examples by which a computing system 100 may support ML-based part determinations for CAD assemblies. Additional or alternative steps in the logic 400 are contemplated herein, for example according to any of the features described herein for the assembly access engine 108, the part determination engine 110, or any combinations of both.

Figure 5:
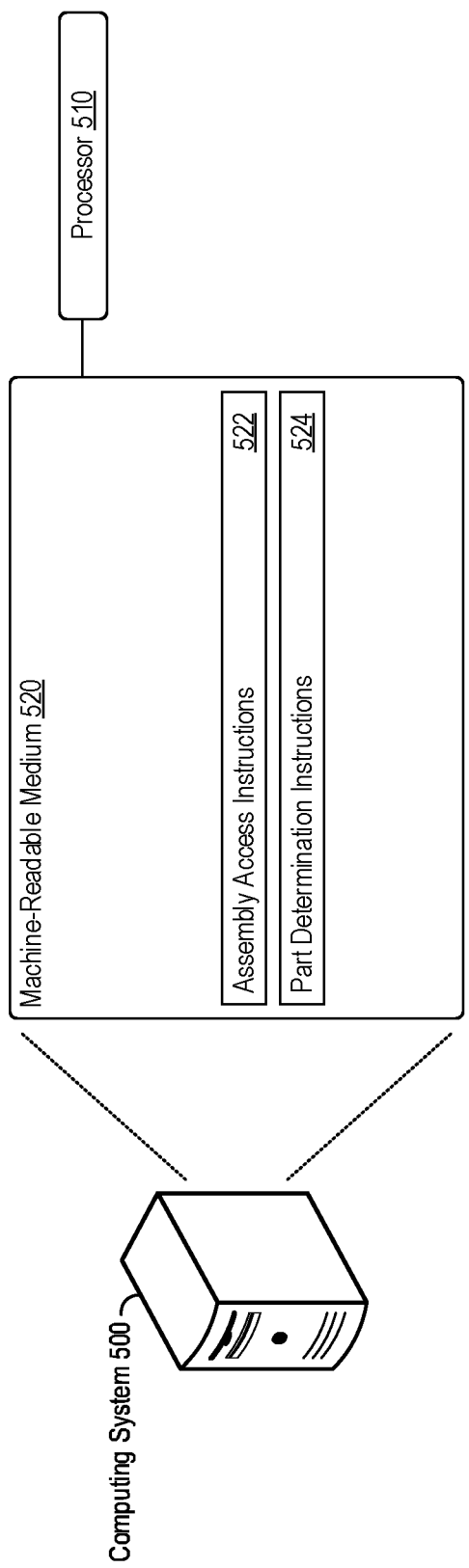
FIG. 5 shows an example of a computing system that supports ML-based part determinations for CAD assemblies.

FIG. 5 shows an example of a computing system 500 that supports ML-based part determinations for CAD assemblies. The computing system 500 may include a processor 510, which may take the form of a single or multiple processors. The processor(s) 510 may include a central processing unit (CPU), microprocessor, or any hardware device suitable for executing instructions stored on a machine-readable medium. The computing system 500 may include a machine-readable medium 520. The machine-readable medium 520 may take the form of any non-transitory electronic, magnetic, optical, or other physical storage device that stores executable instructions, such as the assembly access instructions 522 and the part determination instructions 524 shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor 510. Executing the instructions (e.g., the assembly access instructions 522 and/or the part determination instructions 524) may cause the computing system 500 to perform any of the ML-based part determination features described herein, including according to any of the features with respect to the assembly access engine 108, the part determination engine 110, or a combination of both.

For example, execution of the assembly access instructions 522 by the processor 510 may cause the computing system 500 to access a CAD assembly that digitally represents a product component that includes multiple parts. Execution of the part determination instructions 524 by the processor 510 may cause the computing system 500 to determine a recommended part for the CAD assembly, including by providing the CAD assembly as an input to an ML model trained with assembly structure data of CAD assemblies of a common product type as the CAD assembly, generating a candidate part set through the ML model, the candidate part set comprising different candidate parts to include in the CAD assembly as the recommended part, filtering the candidate part set based on physical and cost characteristics of the different candidate parts of the candidate part set, and identifying the recommended part from the filtered candidate part set. Execution of the part determination instructions 524 by the processor 510 may further cause the computing system 500 to insert the recommended part into the CAD assembly and provide the CAD assembly in support of physical manufacture of the product component represented by the CAD assembly.

Any additional or alternative features as described herein may be implemented via the assembly access instructions 522, part determination instructions 524, or a combination of both.

The systems, methods, devices, and logic described above, including the assembly access engine 108 and the part determination engine 110, may be implemented in many different ways in many different combinations of hardware, logic, circuitry, and executable instructions stored on a machine-readable medium. For example, the assembly access engine 108, the part determination engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any of the described features for the assembly access engine 108, the part determination engine 110, or combinations thereof.

The processing capability of the systems, devices, and engines described herein, including the assembly access engine 108 and the part determination engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
accessing a computer-aided design (CAD) assembly that digitally represents a product component that includes multiple parts;
performing a machine-learning (ML)-based part determination process for the CAD assembly, including by:
providing the CAD assembly as an input to a ML model trained with assembly structure data of CAD assemblies of a common product type as the CAD assembly;
generating a candidate part set through the ML model, the candidate part set comprising a plurality of candidate parts as candidates to include in the CAD assembly through the ML-based part determination process;
filtering the candidate part set based on geometric constraints of an assembly space at which a recommended part determined through the ML-based part determination process is to be positioned in the CAD assembly, including by:
performing a geometric analysis of the assembly space in the CAD assembly to determine a bounding box that specifies physical dimension constraints for the recommended part determined through the ML-based part determination process; and
removing, from the candidate part set, any candidate part of the plurality of candidate parts with part dimensions that exceed the bounding box; and
filtering the candidate part set based on physical and cost characteristics of the different candidate parts of the candidate part set, including by removing, from the candidate part set, any candidate part of the plurality of candidate parts with cost characteristics or physical characteristics that do not satisfy a filtering criterion; and identifying the recommended part for inclusion in the CAD assembly from the filtered candidate part set; and inserting the recommended part into the CAD assembly; and providing the CAD assembly in support of physical manufacture of the product component represented by the CAD assembly.

2. The method of claim 1, wherein filtering the candidate part set based on physical and cost characteristics of the different candidate parts comprises accessing a knowledge graph that utilizes a common ontology to track part data from multiple different systems that store different types of part data.

3. The method of claim 2, wherein the multiple different systems comprise a manufacturer system that stores physical part data including part weights and part materials and a supply chain system that stores part availability and part cost data.

4. The method of claim 1, wherein identifying the recommended part from the filtered candidate part set comprises:

generating a ranked list of the filtered candidate part set based on user-specified criteria; and determining the recommended part based on a user selection from the ranked list.

5. The method of claim 1, wherein the recommended part is a replacement part to replace an existing part in the CAD assembly or wherein the recommended part is a new part to add into the CAD assembly.

6. A system comprising:

a processor; and a non-transitory machine-readable medium comprising instructions that, when executed by the processor, cause a computing system to:

access a computer-aided design (CAD) assembly that digitally represents a product component that includes multiple parts;

perform a machine-learning (ML)-based part determination process for the CAD assembly, including by:

providing the CAD assembly as an input to a ML model trained with assembly structure data of CAD assemblies of a common product type as the CAD assembly;

generating a candidate part set through the ML model, the candidate part set comprising a plurality of candidate parts as candidates to include in the CAD assembly through the ML-based part determination process;

filtering the candidate part set based on geometric constraints of an assembly space at which a recommended part determined through the ML-based part determination process is to be positioned in the CAD assembly, including by:

performing a geometric analysis of the assembly space in the CAD assembly to determine a bounding box that specifies physical dimension constraints for the recommended part determined through the ML-based part determination process; and removing, from the candidate part set, any candidate part of the plurality of candidate parts with part dimensions that exceed the bounding box; and filtering the candidate part set based on physical and cost characteristics of the different candidate parts of the candidate part set, including by removing, from the candidate part set, any candidate part of the plurality of candidate parts with cost characteristics or physical characteristics that do not satisfy a filtering criterion; and identifying the recommended part for inclusion in the CAD assembly from the filtered candidate part set; and insert the recommended part into the CAD assembly; and provide the CAD assembly in support of physical manufacture of the product component represented by the CAD assembly.

7. The system of claim 6, wherein the instructions, when executed, cause the computing system to filter the candidate part set based on physical and cost characteristics of the different candidate parts by accessing a knowledge graph that utilizes a common ontology to track part data from multiple different systems that store different types of part data.

8. The system of claim 7, wherein the multiple different systems comprise a manufacturer system that stores physical part data including part weights and part materials and a supply chain system that stores part availability and part cost data.

9. The system of claim 6, wherein the instructions, when executed, cause the computing system to identify the recommended part from the filtered candidate part set by:

generating a ranked list of the filtered candidate part set based on user-specified criteria; and determining the recommended part based on a user selection from the ranked list.

10. The system of claim 6, wherein the recommended part is a replacement part to replace an existing part in the CAD assembly or wherein the recommended part is a new part to add into the CAD assembly.

11. A non-transitory machine-readable medium comprising instructions that, when executed by a processor, cause a computing system to:

access a computer-aided design (CAD) assembly that digitally represents a product component that includes multiple parts;

perform a machine-learning (ML)-based part determination process for the CAD assembly, including by:

providing the CAD assembly as an input to a ML model trained with assembly structure data of CAD assemblies of a common product type as the CAD assembly;

generating a candidate part set through the ML model, the candidate part set comprising a plurality of candidate parts as candidates to include in the CAD assembly through the ML-based part determination process;

filtering the candidate part set based on geometric constraints of an assembly space at which a recommended part determined through the ML-based part determination process is to be positioned in the CAD assembly, including by:

performing a geometric analysis of the assembly space in the CAD assembly to determine a bounding box that specifies physical dimension constraints for the recommended part determined through the ML-based part determination process; and removing, from the candidate part set, any candidate part of the plurality of candidate parts with part dimensions that exceed the bounding box; and filtering the candidate part set based on physical and cost characteristics of the different candidate parts of the candidate part set, including by removing, from the candidate part set, any candidate part of the plurality of candidate parts with cost characteristics or physical characteristics that do not satisfy a filtering criterion; and identifying the recommended part for inclusion in the CAD assembly from the filtered candidate part set; and insert the recommended part into the CAD assembly; and provide the CAD assembly in support of physical manufacture of the product component represented by the CAD assembly.

12. The non-transitory machine-readable medium of claim 11, wherein the instructions cause the computing system to filter the candidate part set based on physical and cost characteristics of the different candidate parts by accessing a knowledge graph that utilizes a common ontology to track part data from multiple different systems that store different types of part data.

13. The non-transitory machine-readable medium of claim 12, wherein the multiple different systems comprise a manufacturer system that stores physical part data including part weights and part materials and a supply chain system that stores part availability and part cost data.

14. The non-transitory machine-readable medium of claim 11, wherein the instructions cause the computing system to identify the recommended part from the filtered candidate part set by:

generating a ranked list of the filtered candidate part set based on user-specified criteria; and determining the recommended part based on a user selection from the ranked list.

* * * * *